(12) United States Patent
Valadon et al.

(10) Patent No.: US 8,218,699 B2
(45) Date of Patent: Jul. 10, 2012

(54) CHANNEL IMPULSE RESPONSE ESTIMATE MANAGEMENT

(75) Inventors: Cyril Valadon, Letchworth (GB); Richard Lane, Cottenham (GB); Neil Colin Campbell, Cambridge (GB)

(73) Assignee: MStar Semiconductor, Inc., Grand Cayman (KY)

( * ) Notice: Subject to any disclaimer, the term of this patent is extended or adjusted under 35 U.S.C. 154(b) by 450 days.

(21) Appl. No.: 12/306,411

(22) PCT Filed: Jun. 12, 2007

(86) PCT No.: PCT/GB2007/002155
§ 371 (c)(1),
(2), (4) Date: Aug. 7, 2009

(87) PCT Pub. No.: WO2008/001041
PCT Pub. Date: Jan. 3, 2008

(65) Prior Publication Data
US 2010/0040176 A1  Feb. 18, 2010

(30) Foreign Application Priority Data
Jun. 28, 2006  (GB) .................................. 0612850.8

(51) Int. Cl.
*H04B 1/10* (2006.01)
(52) U.S. Cl. ....................................................... 375/350
(58) Field of Classification Search .......... 375/231–232, 375/340, 342, 350; 455/67.11, 226.1
See application file for complete search history.

(56) References Cited

U.S. PATENT DOCUMENTS

| | | | |
|---|---|---|---|
| 7,266,160 B2 * | 9/2007 | Kocic et al. .................... | 375/319 |
| 7,310,394 B2 * | 12/2007 | Wang ............................. | 375/350 |
| 7,860,193 B2 * | 12/2010 | Gupta ........................... | 375/340 |
| 8,009,745 B2 * | 8/2011 | Glazko et al. ................. | 375/260 |
| 2004/0174940 A1 * | 9/2004 | Kim et al. ...................... | 375/340 |
| 2008/0123728 A1 * | 5/2008 | Xia et al. ....................... | 375/231 |

FOREIGN PATENT DOCUMENTS

| | | |
|---|---|---|
| EP | 0954142 A1 | 11/1999 |
| WO | 2005/048548 A2 | 5/2005 |
| WO | 2006/027607 A2 | 3/2006 |

* cited by examiner

*Primary Examiner* — Khanh C Trab
(74) *Attorney, Agent, or Firm* — Edell, Shapiro & Finnan, LLC

(57) ABSTRACT

A method of steering a channel estimation search window, the method comprising providing a series of raw CIR tap values to span a channel estimation search window containing a sub-window whose contents are intended to be passed for further processing to produce a refined CIR estimate, determining, amongst a plurality of groups of continuous tap values within the window, the group containing the largest amount of signal energy and time-shifting the window as necessary to arrange that the group so determined occupies the sub-window.

10 Claims, 3 Drawing Sheets

Figure 1 (*prior art*)

CHANNEL IMPULSE RESPONSE ESTIMATE MANAGEMENT

BACKGROUND

In a typical radio system, information is modulated onto a radio carrier by a transmitter. This signal then travels via an unknown and changing environment to the receiver. The ability to estimate the characteristics of this propagation environment and to mitigate the impact on the received signal is often key to the performance of a receiver.

FIG. 1 depicts various processing stages that form part of such an approach. It should be noted that the blocks shown in FIG. 1 represent processing operations performed on a received signal but do not necessarily correspond directly to physical units that may appear within a practical implementation of a receiver. The first stage 101 corresponds to the radio frequency processing. During the radio frequency processing, the received signal is down-converted to base-band using a mixer 103. The reference frequency used to drive the mixer is generated by an oscillator 104. Following this carrier down-conversion, the signal is low-pass filtered 102 and then passed to the mixed-signal processing stage 108. The mixed signal processing includes Analogue-to-Digital Conversion (ADC) 105, sampling 106 and low pass filtering 107. The resulting signal, which is now digital, is supplied to the digital signal processing stage 111 where it is processed such that the transmitted information can be recovered. The received signal is first processed by the channel estimation unit 109 where an estimate of the Channel Impulse Response (CIR) is generated. This estimated CIR is processed in combination with the received signal by the demodulation unit 110 such that the sequence of transmitted bits can be recovered.

In the downlink of cellular communication systems, a pilot signal is usually transmitted in combination with the information bearing signals such that the receiver can estimate the propagation channel. For Wideband Code-Division Multiple Access (W-CDMA) schemes, this pilot signal is typically code-multiplexed with the transmitted signal. For example, in the 3GPP standard, the Common Pilot Channel (CPICH) is a sequence of known bits which are modulated, spread and added to the downlink signal (3*GPP TS* 25.211; *Technical Specification Group Radio Access Network; Physical channels and mapping of transport channels onto physical channels (FDD)*). At the receiver, it is possible to generate an estimate of the CIR by correlating the received signal with the known CPICH pilot sequence.

The accuracy of the channel estimation process is crucial in determining the quality of the demodulation process. For W-CDMA systems, it is typical to use a Rake architecture at the receiver (*CDMA—Principles of Spread Spectrum Communication*, Andrew J. Viterbi, Addison-Wesley Wireless Communications Series). In the Rake receiver, the weights associated with the different fingers correspond to the estimated CIR taps at the finger delay locations. The noise affecting these finger weights increases the likelihood of errors in the demodulation process. More recently, new receiver architectures have been introduced where the demodulation accuracy is improved at the expense of the implementation complexity. The Linear Minimum Mean Square Error (LMMSE) equaliser is an example of such an architecture (*Chip-Level Channel Equalization in WCDMA Downlink*, K. Hooli, M. Juntti, M. J. Heikkila, P. Komulainen, M. Latva-aho, J. Lilleberg, *EURASIP Journal on Applied Signal Processing*, August 2002). The LMMSE equaliser improves the performance of the demodulation unit by mitigating the distortions introduced by the propagation channel. The LMMSE equaliser can be implemented using a pre-filter Rake architecture (*Equalization in WCDMA terminals*, Kari Hooli, PhD thesis, 2003) where the conventional Rake receiver is preceded by a linear filter which aims to remove the Inter-Symbol Interference (ISI) introduced by the channel. In the pre-filter Rake receiver, the channel estimates are used both to set the weights of the Rake receiver as well as to derive the coefficients of the linear pre-filter.

For the pre-filter Rake to operate correctly, it is important that the estimated channel impulse response is wide enough to cover all the paths with significant power. This calls for a large window of channel estimation. However using a large window has three drawbacks. First, the wider the estimation window, the larger the number of computations required to generate the channel estimated values. The second problem is that a larger channel delay spread requires more taps in the pre-filter for accurate equalisation. Finally, the number of computations required to calculate the pre-filter configuration typically increases with the square of the number of channel taps. Hence, it is important to keep the length of the channel to be equalised as small as possible while still being able to react quickly to paths appearing at different locations.

SUMMARY OF THE INVENTION

According to one aspect, the invention provides a method of steering a channel estimation search window, the method comprising providing a series of raw CIR tap values to span a channel estimation search window containing a sub-window whose contents are intended to be passed for further processing to produce a refined CIR estimate, determining, amongst a plurality of groups of contiguous tap values within the window, the group containing the largest amount of signal energy and time-shifting the window as necessary to arrange that the group so determined occupies the sub-window.

Thus multipath searching can be conducted over a relatively wide range of delay (i.e. over the window) to track the evolution of the multipath profile whilst focussing the processing effort on a relatively narrow range of delay (i.e. over the sub-window) in the production of a refined CIR estimate.

In certain embodiments, the further processing of the sub-window contents to produce the refined CIR estimate involves the filtering of the sub-window contents.

In certain embodiments, the sub-window is centrally located within the window to facilitate the recognition of multipath components arising to either side of the group of taps that is currently being put forward for further processing to produce the refined CIR estimate.

In certain embodiments, the plurality of groups of contiguous tap values that is used in the determination of a maximum signal energy group comprises all possible groups of contiguous tap values of length equal to the sub-window.

Clearly, time-shifting of the window to realign the sub-window only occurs if the maximum signal energy group of taps is not already aligned with the sub-window. The invention may operate cyclically, with the presentation in each cycle of raw tap values to span the window, which may have been repositioned in the previous cycle. In each such cycle, there is the potential to evaluate the raw tap values within the window to determine the need for a time shift to the window to align the sub-window with the maximum signal energy group of taps. In certain embodiments, this evaluation does not occur in a particular cycle if a certain period has not elapsed since the last occasion that the invention applied a time shift to the window. In certain other embodiments, this evaluation does occur within a given cycle irrespective of when the last time shift occurred but any time shift mandated by the evaluation is not applied to the window unless a certain period has elapsed since the last time shift was applied.

Typically, the contents of the sub-window are intended to be supplied for filtering to generate a refined CIR estimate. Typically, the content of each sub-window position is fed to a respective filter. When time shifting of the sub-window occurs, then, in certain embodiments, the states of these filters undergo a corresponding shift. In this way, the refined CIR estimate is likely to be less disturbed by time shifting of the sub-window. Consider, for example, an embodiment where each position in the sub-window feeds into a respective filter, the outputs of these filters yielding the refined CIR estimate: if the invention time shifts the window such that the raw tap values move n places forward through the sub-window, then the state of the filter applied to the last position of the sub-window is arranged to adopt the state of the filter applied to the sub-window position that is located n places back and analogous changes are made to the states of the filters located at the other positions in the sub-window, with the exception of the filters at the first n locations in the sub-window whose filter states are instead initialised.

In determining the need for a time shift, the signal energy contained in various groups of contiguous taps is assessed. In certain embodiments, the signal energy within a given tap group is assessed by summing values indicative of the signal energy present at the tap positions within the group. In certain embodiments, the values indicative of signal energy are filtered before summation. Typically, each position in a group is fed to a respective filter. When time shifting of the sub-window occurs, then, in certain embodiments, the states of these filters undergo a corresponding shift. In this way, the filtering of the values is likely to be less disturbed by time shifting of the sub-window.

In one embodiment of the proposed architecture, initial channel estimates are first generated through correlation between a received signal and a known pilot sequence. In case of transmit diversity, a set of initial channel estimates is generated for each of the transmit antennas. The central M taps from these initial channel estimates are then passed through a number (one or more) of filters to improve the accuracy of the channel estimates. It should however be noted that the application of the approach described in this document is not limited to the case where initial channel estimates are generated through correlation between the received signal and the known pilot sequence.

A method for selecting the 'best' M taps from a full set of L raw channel estimates is presented by the invention. In the case of transmit diversity, multiple sets of channel estimates may be generated. However, the invention can be arranged to always operate on the channel estimates from a given antenna, thus reducing the implementation complexity.

As indicated earlier, the raw channel estimates may be filtered to improve their accuracy. When the receiver timing is modified, for example to track changes in the channel, the states of the different filters are updated to match the current conditions. An approach used to initialise the filter states for timing positions where no prior information is available is also presented in this document.

In certain embodiments, a mechanism is provided in order to limit timing changes in consecutive channel estimation periods, as follows. Following a timing change, a counter is initialised to a pre-determined value. This counter is then decremented every time a new set of channel estimates is generated. No further change to the timing of the receiver is allowed until the counter reaches 0.

Although the present invention has been described primarily in terms of a method, it will be apparent that the invention could equally well be realised in hardware, software executed through a processing device, or a combination of both.

BRIEF DESCRIPTION OF THE DRAWINGS

By way of example only, certain embodiments of the present invention will now be described by reference to the accompanying drawings, in which.

DETAILED DESCRIPTION

To facilitate the description of some embodiments of the invention, a model of a transmission link will first be presented.

The received signal can be expressed as $$r(k) = \sum_{l=0}^{P} h(l)c(k-l) + \sum_{l=0}^{P} h(l)s(k-l) + \zeta(k)$$

where $\{h(k)\}_{k \in \{0, \ldots, P\}}$ represent the different propagation channel taps. $\zeta(k)$ models the combination of thermal noise and interference from adjacent cells. $\zeta(k)$ is assumed to be Additive White Gaussian Noise (AWGN) with variance equal to $\sigma^2$. The samples c(k) denote the transmitted pilot sequence and s(k) is used to represent the other signals from the different users in the serving cell.

The CIR is derived by correlating the received signal with the pilot sequence $$\hat{h}_t(l) = \frac{1}{N} \sum_{k=0}^{N-1} r(k)c^*(k-l)$$

$$l = 0, 1, \ldots, L-1$$

where N is the spreading factor of the W-CDMA pilot signal, L is the length of the channel estimation window and t represents the current CIR estimation period. In general, L≠P. Indeed, P is a function of the current propagation conditions, whilst L is chosen by design.

Figure 1:
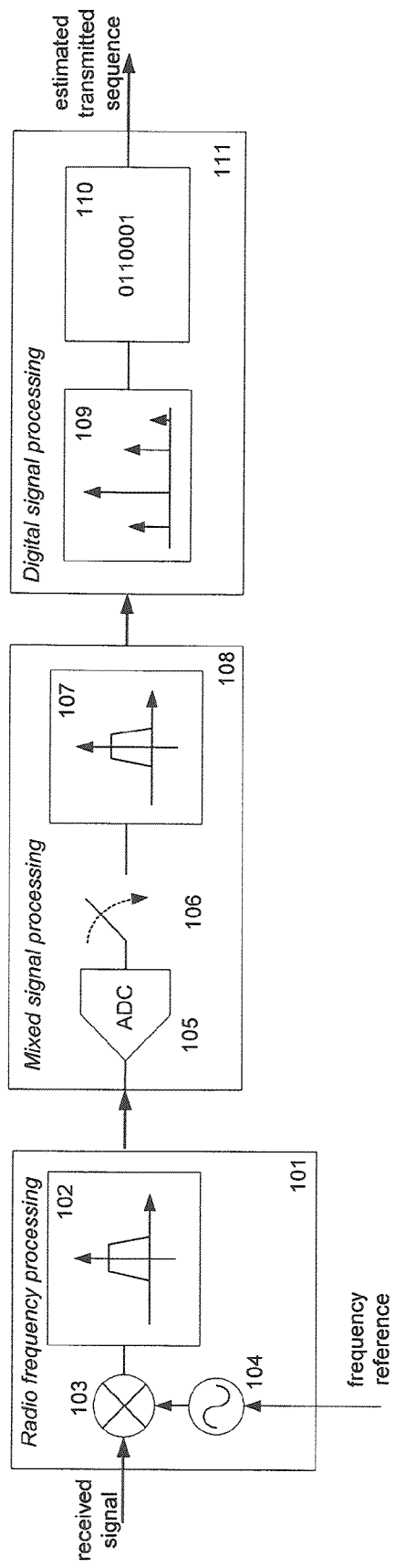
FIG. 1 presents a typical receiver where the channel estimation architecture is used.
Figure 2:
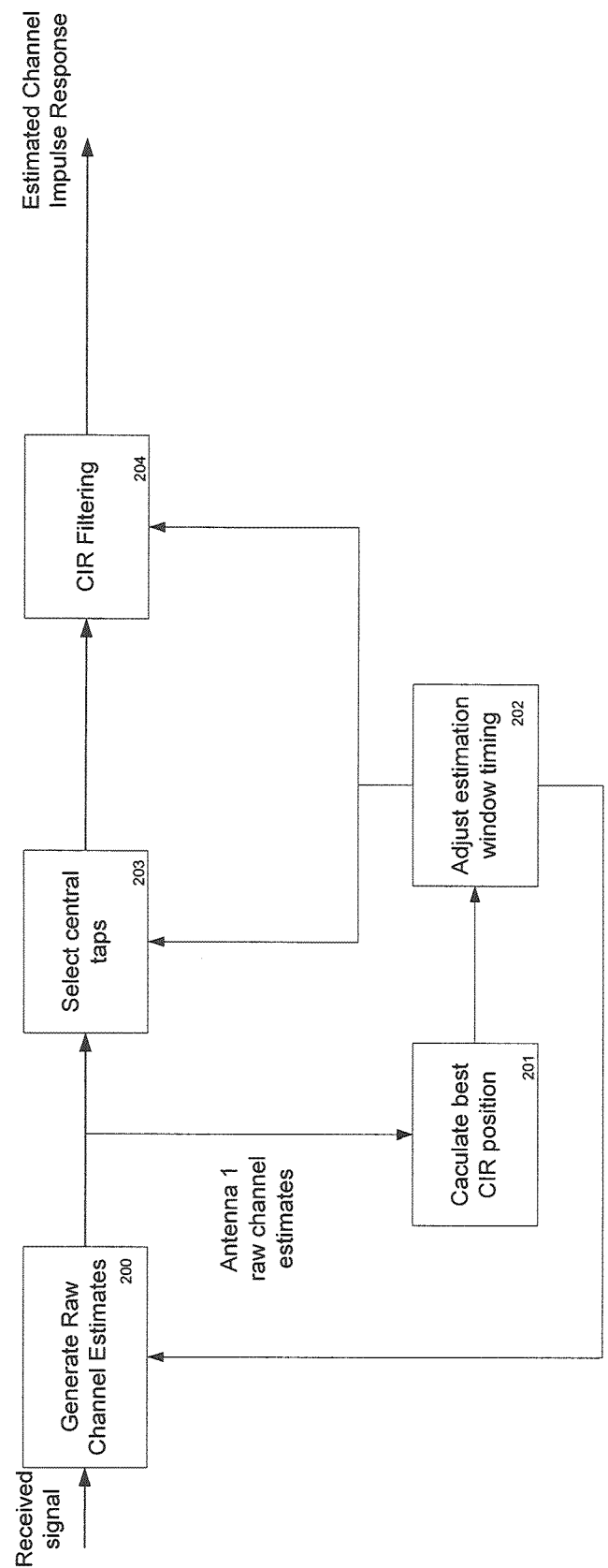
FIG. 2 presents the processing stages in channel estimation window positioning apparatus.
Figure 3:
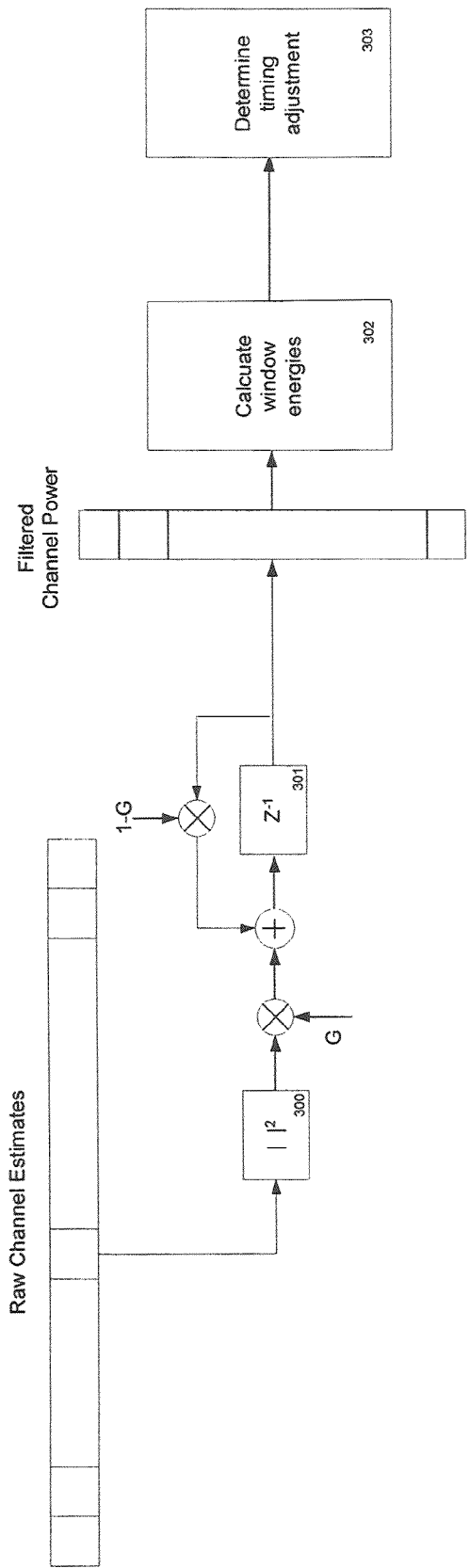
FIG. 3 presents the processing stages in calculation the position of the best CIR within the estimation window.

The various processing stages of an embodiment of the proposed architecture are presented in FIG. 2. In this embodiment, a channel estimate containing L consecutive taps is estimated and, from that, the best M (M<L) consecutive taps are chosen as the raw channel estimates that are then processed further to produce a refined CIR such as can then be employed by, for example, an LMMSE equaliser implemented as a pre-filter rake architecture. The further processing of the raw channel estimates generally improves the accuracy of the CIR (hence the term refined CIR) by reducing the power of the estimation error. One method for achieving this is to use one or more filters that are either designed to match the expected channel conditions or to adapt to the changing channel conditions.

In the present embodiment, filtering to produce a refined CIR estimate is performed over only M taps whilst it remains possible to detect paths that appear in the L-M taps of the L raw tap values that lie beyond the M taps that are used to produce the refined CIR estimate. In the present embodiment, wherein the filtering of the CIR estimate is only performed over M taps, whilst it is still possible to detect paths that appear up to +−(L−M)/2 chips away from the current window.

When new paths are detected outside the current window and it is judged advantageous to include those paths in the CIR, a timing adjustment is made such that the best L taps are centralised within the channel estimation window. Making a timing adjustment requires either discarding or repeating input samples and also requires the current CIR to be moved to match the new estimation window.

In order to avoid moving the receiver timing in response to variations in the noise level in the different channel taps, a filtered version of the channel power profile is used to select the best equalisation window.

Moving the channel estimation window can lead to problems in the channel estimation. If the channel estimation window is moved to often, the resulting channel estimates may become degraded. The present embodiment describes a hangover mechanism whereby further timing changes are disabled for a specified period after a timing change has been made.

The received signal is first processed by unit 200 in order to generate raw channel estimates. These initial channel estimates can be generated, for example, by correlating the received signal with the known pilot sequence as described in the above equations. It should however be noted that the application of the present invention is not restricted to this case. It would be possible to use other techniques, such as linear Least-Square fitting (*Digital Communications*, John G. Proakis, $2^{nd}$ edition, McGraw-Hill International), in order to derive these channel estimates. In case of transmit diversity, either open-loop or closed-loop, the unit 200 will generate a set of initial channel estimates for each transmit antenna.

The raw channel estimates from Antenna 1 are passed on to unit 201 that calculates the position of the best CIR within the channel estimation window and the timing adjustment required to centralize this CIR within the estimation window.

To find the position of the best CIR, the channel power is first calculated and then filtered by units 300 and 301 respectively. The resultant CIR power delay profile is given by $$P_t(l) = (1-G)P_{t-1}(l) + G|\hat{h}_t(l)|^2$$

The smoothing factor, G, is introduced to ensure that the CIR power delay profile is not unduly affected by the CIR estimation error. The above equation describes the filtering operation when a first order IIR implementation is used. It will be obvious to anyone skilled in the art that the proposed approach can easily be extended to other filter architectures.

Unit 302 calculates the window energies in the following way $$E(i) = \sum_{l=i}^{i+M} P(l)$$

$$i = 0, \ldots, L - M$$

and selects the maximum energy, $$E_{max} = \max_i [E(i)]$$

with corresponding index $i_{max}$. Additionally, the energy of the currently central window $E_{curr} = E(\lfloor(L-M+1)/2\rfloor)$ is selected.

Unit 303 determines the timing adjustment required to centralise the maximum energy window in the following manner $$\Delta_t = \begin{cases} i_{max} - (\lfloor(L-M+1)/2\rfloor) & \text{if } E_{max} > \tau E_{curr} \\ 0 & \text{otherwise} \end{cases}$$

where $\tau$ is a threshold introduced to ensure that timing changes only occur if $E_{max}$ is sufficiently greater than $E_{curr}$.

Unit 202 applies the required timing adjustment, $\Delta_t$, only if $\Delta_t \neq 0$ and $T_d = 0$, where $T_d$ is a counter that is set to T1 when a timing adjustment is applied and is decremented each channel estimation period until it reaches 0. The choice of value for T1 is made to prevent timing changes happening in rapid succession, which may have an adverse affect on the CIR estimation.

When a timing adjustment is applied, the input data is advanced/retarded by $\Delta_t$. Since the incoming data is continuously sampled, either discarding or repeating samples at the input achieves this. New raw channel estimates are produced based on this new timing.

Unit 203 selects the central M taps of the raw CIR for processing by unit 204 that filters the raw CIR to reduce the channel estimate errors. When a timing adjustment is applied, the state of the CIR filter(s) requires shifting in time such to take into account the applied timing change. If this is not done, the estimated CIR produced by unit 204 will contain errors for at least as long at the maximum group delay of the CIR filter(s), which will result in significant performance degradation.

On application of a timing adjustment, the filtered CIR power delay profile P also requires shifting in time, which is achieved at the next channel estimate update period in the following manner $$P_t(l) = \begin{cases} (1-G)P_{t-1}(l+\Delta_t) + G|\hat{h}_t(l)|^2 & 0 \le l + \Delta_t \le L - M \\ |\hat{h}_t(l)|^2 & \text{otherwise} \end{cases}$$

Note that the above description of this invention assumes that all the data is sampled at 1 sample per chip, however it is straightforward to extend this to apply to data that is sampled at higher rates.

The invention claimed is:

1. A method of steering a channel estimation search window, the method comprising:
   providing a series of raw CIR tap values to span a channel estimation search window containing a sub-window whose contents are intended to be passed for further processing to produce a refined CIR estimate;
   determining, amongst a plurality of groups of continuous tap values within the window, the group containing the largest amount of signal energy; and
   time-shifting the window as necessary to arrange that the group so determined occupies the sub-window,
   wherein the further processing of the sub-window contents to produce the refined CIR estimate involves the filtering of the sub-window contents,
   wherein time shifting of the window is permitted only if the window has not been time shifted within a certain period of time.

2. A method according to claim 1, wherein the sub-window is centrally located within the window.

3. A method according to claim 1, wherein the plurality of groups of continuous tap values that is used in the determination of a maximum signal energy group comprises all possible groups of continuous tap values of length equal to the sub-window.

4. A non-transitory computer-readable memory medium storing instructions that, when executed by a data processing apparatus, cause the apparatus to:
provide a series of raw CIR tap values to span a channel estimation search window containing a sub-window whose contents are intended to be passed for further processing to produce a refined CIR estimate;
determine, amongst a plurality of groups of continuous tap values within the window, the group containing the largest amount of signal energy; and
time-shift the window as necessary to arrange that the group so determined occupies the sub-window,
wherein the further processing of the sub-window contents to produce the refined CIR estimate involves the filtering of the sub-window contents,
wherein time shifting of the window is permitted only if the window has not been time shifted within a certain period of time.

5. A method according to claim 4, wherein the sub-window is centrally located within the window.

6. A method according to claim 4, wherein the plurality of groups of continuous tap values that is used in the determination of a maximum signal energy group comprises all possible groups of continuous tap values of length equal to the sub-window.

7. A receiver for estimating a propagation channel, the receiver comprising:
means for producing a series of raw CIR tap values to span a channel estimation search window containing a sub-window whose contents are intended to be passed for further processing to produce a refined CIR estimate;
means for determining, amongst a plurality of groups of continuous tap values within the window, the group containing the largest amount of signal energy; and
means for time-shifting the window as necessary to arrange that the group so determined occupies the sub-window,
wherein the sub-window is centrally located within the window,
wherein the means for time-shifting the window is permitted to operate only if the window has not been time shifted within a certain period of time.

8. A receiver according to claim 7 further comprising filtering means for filtering the sub-window contents for producing the refined CIR estimate.

9. A receiver according to claim 7, wherein the plurality of groups of continuous tap values that is used in the determination of a maximum signal energy group comprises all possible groups of continuous tap values of length equal to the sub-window.

10. A receiver according to claim 8, wherein the plurality of groups of continuous tap values that is used in the determination of a maximum signal energy group comprises all possible groups of continuous tap values of length equal to the sub-window.

* * * * *